July 31, 1951 — R. B. DE LANO, JR — 2,562,450
PULSE CUTOFF DEVICE
Filed July 5, 1947

INVENTOR.
RALPH B. DE LANO JR.
BY
Joseph H. Lipschutz
ATTORNEY

Patented July 31, 1951

2,562,450

UNITED STATES PATENT OFFICE 2,562,450

PULSE CUTOFF DEVICE

Ralph B. De Lano, Jr., New York, N. Y., assignor to Sperry Products, Inc., Hoboken, N. J., a corporation of New York Application July 5, 1947, Serial No. 759,240

3 Claims. (Cl. 250—36)

This invention relates to pulse generating devices wherein a predetermined number of electric pulsations constituting a wave train are generated. Such pulses are employed in many different applications and in some uses it is desirable and in fact essential that the pulse terminate as sharply and abruptly as possible. Thus in the case of supersonic inspection of materials by generating a wave train which is caused to travel into the material until it strikes a reflecting surface and is then reflected, whereby the time interval between transmission and reception of the pulse is an indication of the distance of the reflecting surface beneath the transmitting surface, it is essential that the pulse be terminated abruptly, otherwise the returning reflections of the pulse will be merged with the transmitted pulse. Such a system is disclosed in the patent to F. A. Firestone No. 2,280,226 granted April 21, 1942. As disclosed in said patent the pulse is generated by the discharge of a gas tube which, as is well known, has an exponential decay. Such gradual termination of the pulse means that if a reflecting surface lies close to the transmitting surface it will be impossible to detect it because the magnitude of the voltage generated by the reflections will be much smaller than that existing in the tail of the pulse.

It is therefore the principal object of this invention to provide a pulse cutoff device which will sharply terminate the generated pulse.

Further objects and advantages of this invention will become apparent in the following detailed description thereof.

Figure 1:
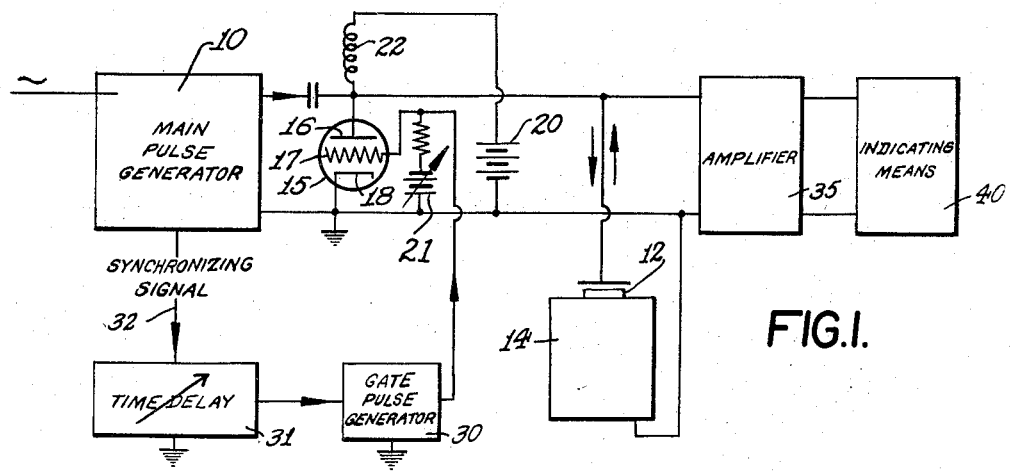

In the accompanying drawings,

Fig. 1 is a diagrammatic representation of one embodiment of this invention.

Figure 2A:
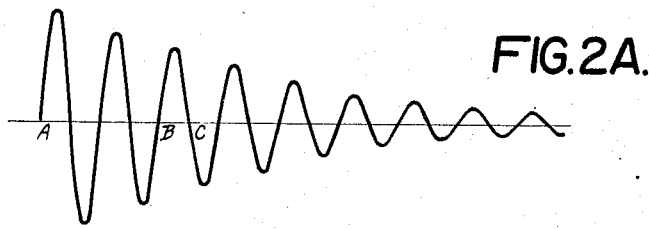

Figs. 2A, B and C are graphs illustrating the principle of this invention.

As shown in Fig. 1 the invention is applied to a system wherein an electrically generated pulse is applied to a piezo-electric crystal which transforms the electric pulse into mechanical vibrations and which on receipt of mechanical vibrations transforms them into electrical pulsations. While this application to supersonic inspection is illustrated, it will be readily understood that the principle of a sharp pulse cutoff device has general application to the art of pulse generation.

Referring to Fig. 1 there is shown a pulse generator 10 which may be of any known type such as, for example, the type disclosed in the said Firestone patent. Essentially such pulse generator comprises an oscillatory circuit which is keyed from any suitable power source. Thus, if the pulse generator is keyed from a 60 cycle A. C. source the pulse generator will generate 60 pulses per second. These pulses may be employed for any of the many well known uses but as shown in Fig. 1 the pulse is applied to a piezo-electric crystal 12 which may be in contact with the surface of an object 14 whose interior is to be inspected by sending pulses into the object and measuring the time interval between the transmission of the pulse and the reception of its reflection from a reflecting surface within the object, such surface being either an internal defect or the opposite wall of the object under test. Such use is described in detail in the said Firestone patent. In such use, as in many other uses requiring a generated pulse, it is desirable, as stated in the introduction hereto, to cut off the end of the pulse sharply instead of allowing it to decay gradually in the usual exponential decay manner.

To accomplish the above purpose I provide in the output of the pulse generator 10 a hard type electron tube 15 having anode 16, grid 17 and cathode 18, the tube being shunted across the generator output. The power supply may comprise a battery 20 for applying positive voltage to the plate 16 and a battery 21 which normally applies a bias to grid 17 sufficient to cut off the tube and render it non-conductive. An inductance 22 is provided in the tube circuit to prevent the battery 20 from shorting out the generated pulse.

Figure 2B:
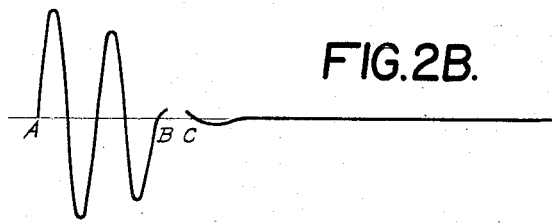
Figure 2C:
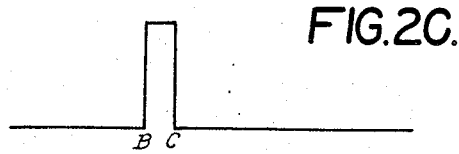

By rendering the tube 15 conductive after a predetermined number of cycles of the generated pulse have been transmitted, the rest of the pulse will be short-circuited and the pulse will be quickly damped. To render the tube 15 conductive, a gate pulse generator 30 is employed which at the desired time will apply to grid 17 of tube 15 a unidirectional square top pulse of approximate duration equal to one cycle of the main pulse (as shown in Fig. 2C) to render the tube conductive. The pulse may be of any type having abrupt rise and fall. The gate pulse generator is controlled by a time delay device 31 which is in turn keyed by a synchronizing signal transmitted from the output of main pulse generator 10 by way of connection 32. The time delay is adjusted so that the pulse from main pulse generator 10 by way of connection 32 will key the gate pulse generator 30 a predetermined number of cycles after the initial generation of the main pulse. Thus, as shown in Fig. 2B the time delay is such as to permit cycles to be generated from A to B but at point B the gate pulse generator 30 is keyed to render tube 15 conductive and thus short out the balance of the pulse which otherwise would have the form disclosed in Fig. 2A. The tube 15 may be chosen of such characteristics that when it is rendered conductive by the application of the gate pulse to grid 17 the tube has at least critical damping resistance for the tuned oscillatory circuit of the main pulse generator and thus will accomplish damping of the pulse in the shortest possible time, i. e., as little as 1 cycle.

With this sharp cutoff the pulse applied to crystal 12 is transmitted into the object under test and by reason of the sharp cutoff, reflections received after C in Fig. 2A, which would otherwise be indistinguishable because they intermingled with the transmitted pulse, can now be readily indicated. This means that reflections much closer to the end of the transmitted pulse can be indicated and therefore much smaller distances below the transmitted surface can be inspected. The reflections received by crystal 12 after being amplified by amplifier 35 may be indicated on any suitable indicating means 40 such as an oscilloscope having a synchronized sweep.

The other consideration is that the sharp wave front occurring at C may introduce a small transient in the pulse circuit through the grid to plate capacity of the tube or by other means. Such a transient applied to the pulse circuit would create another pulse like that in 2A although of very much smaller magnitude and would prevent small reflections from being indicated.

It has been found that this condition can be eliminated by adjusting the leading edge of the gate pulse so that position B with respect to A occurs at a point where there is left in the main pulse circuit an amount of energy which at time C is equal in magnitude to the energy which will be generated in the main pulse circuit by the gate pulse generator at C. By adjusting the position of C so that the pulse generated by the gate pulse generator in the main pulse circuit is out of phase with the energy remaining in the main pulse circuit, these two energy values can be made to cancel each other. C may be adjusted relative to B by adjusting the length of the pulse.

Other methods of accomplishing the result described in the preceding paragraph consist in adjusting the bias on grid 17 so that the damping of the tube is varied to the extent necessary to counteract the energy generated in the main pulse circuit by the trailing end of the gate pulse; and another method consists in varying the amplitude of the gate pulse. With both of these methods the phases of the energy remaining in the main pulse circuit and the energy generated in that circuit by the trailing edge of the gate pulse are adjusted in phase by adjusting the time interval B—C.

Having described my invention, what I claim and desire to secure by Letters Patent is:

1. A pulse cutoff device comprising a main pulse generator adapted to generate a relatively long duration oscillatory pulse, a normally ineffective short-circuiting device for short-circuiting the output of the main pulse generator, a gate pulse generator adapted to generate a pulse having abrupt rise and fall whose duration is approximately ½ cycle of the oscillations in the long duration pulse, means whereby the pulse generated by the gate pulse generator renders the short-circuiting device effective to eliminate the output of the main pulse generator, and means for synchronizing the pulse generated by the gate pulse generator with the pulse generated by the main pulse generator, said last-named means including a time delay means operating between the main pulse generator and the gate pulse generator.

2. A pulse cutoff device comprising a main pulse generator including a tuned oscillatory circuit adapted to generate a pulse containing several oscillations of the tuned circuit, a gate pulse generator, a time delay means, the gate pulse generator being synchronized to the main pulse generator through said delay means, a device for short-circuiting the tuned circuit, said short-circuiting device comprising a high vacuum tube having anode, grid and cathode, means whereby said gate pulse generator renders said short-circuiting device effective to provide substantially critical damping resistance for the tuned circuit and thereby substantially eliminating the further output of the main pulse generator.

3. A pulse cutoff device comprising a main pulse generator adapted to generate a relatively long duration oscillatory pulse, a normally ineffective short-circuiting device for short-circuiting the output of said main pulse generator, said device comprising a high vacuum tube having anode, grid and cathode, a gate pulse generator adapted to generate a pulse whose duration is approximately ½ cycle of the oscillations in the long duration pulse, a time delay means, the gate pulse generator being synchronized to the main pulse generator through said delay means, and means whereby the pulse generated by the gate pulse generator renders the short-circuiting device effective, the trailing edge of the gate pulse tending to generate a transient in the main pulse circuit, and means for eliminating said transient, said last-named means comprising means for controlling the short-circuiting device to leave in the main pulse circuit an amount of energy equal to the energy of said transient.

RALPH B. DE LANO, Jr.

REFERENCES CITED

The following references are of record in the file of this patent:

UNITED STATES PATENTS

| Number | Name | Date |
| --- | --- | --- |
| 2,273,193 | Heising | Feb. 17, 1942 |
| 2,398,701 | Firestone | Apr. 16, 1946 |
| 2,405,552 | Blumlein et al. | Aug. 13, 1946 |
| 2,412,710 | Bradley | Dec. 17, 1946 |
| 2,413,182 | Hollingsworth et al. | Dec. 24, 1946 |
| 2,454,132 | Brown | Nov. 16, 1948 |